United States Patent

Low et al.

[15] 3,678,685

[45] July 25, 1972

[54] SOLAR ENERGY POWERED HELIOTROPE

[72] Inventors: George M. Low, Deputy Administrator of the National Aeronautics and Space Administration with respect to an invention of; Ralph Crawford, Cupertino, Calif.

[22] Filed: Sept. 25, 1970

[21] Appl. No.: 75,431

[52] U.S. Cl....................................................60/23, 60/26
[51] Int. Cl..........................................F03g 7/06, F03g 7/02
[58] Field of Search..................................................60/23, 26

[56] References Cited

UNITED STATES PATENTS

| | | | |
|---|---|---|---|
| 3,630,020 | 12/1971 | Chase et al. | 60/23 |
| 3,635,015 | 1/1972 | Samuels | 60/26 |
| 2,920,710 | 1/1960 | Howard | 60/26 UX |
| 3,029,596 | 4/1962 | Hanold et al. | 60/26 X |
| 3,152,260 | 10/1964 | Cummings | 60/26 X |

Primary Examiner—Edgar W. Geoghegan
Assistant Examiner—Allen M. Ostrager
Attorney—R. F. Kempf, N. B. Siegel and John R. Manning

[57] ABSTRACT

This invention relates to a solar energy powered heliotrope which functions in a passive, stored energy manner to orient a solar array towards the sun. A bimetallic motor element is activated by solar energy to generate a work output. A constant torque spring assembly coupled to the motor element stores useful energy as a function of the work output. A bimetallic sensing element detects misorientation between the solar array and the sun. An escapement mechanism is actuated by the sensing element whenever misorientation between the solar array and the sun is detected; the escapement mechanism automatically and incrementally releases the stored energy to rotate the solar array in discrete increments until it is oriented towards the sun.

12 Claims, 4 Drawing Figures

Patented July 25, 1972 3,678,685
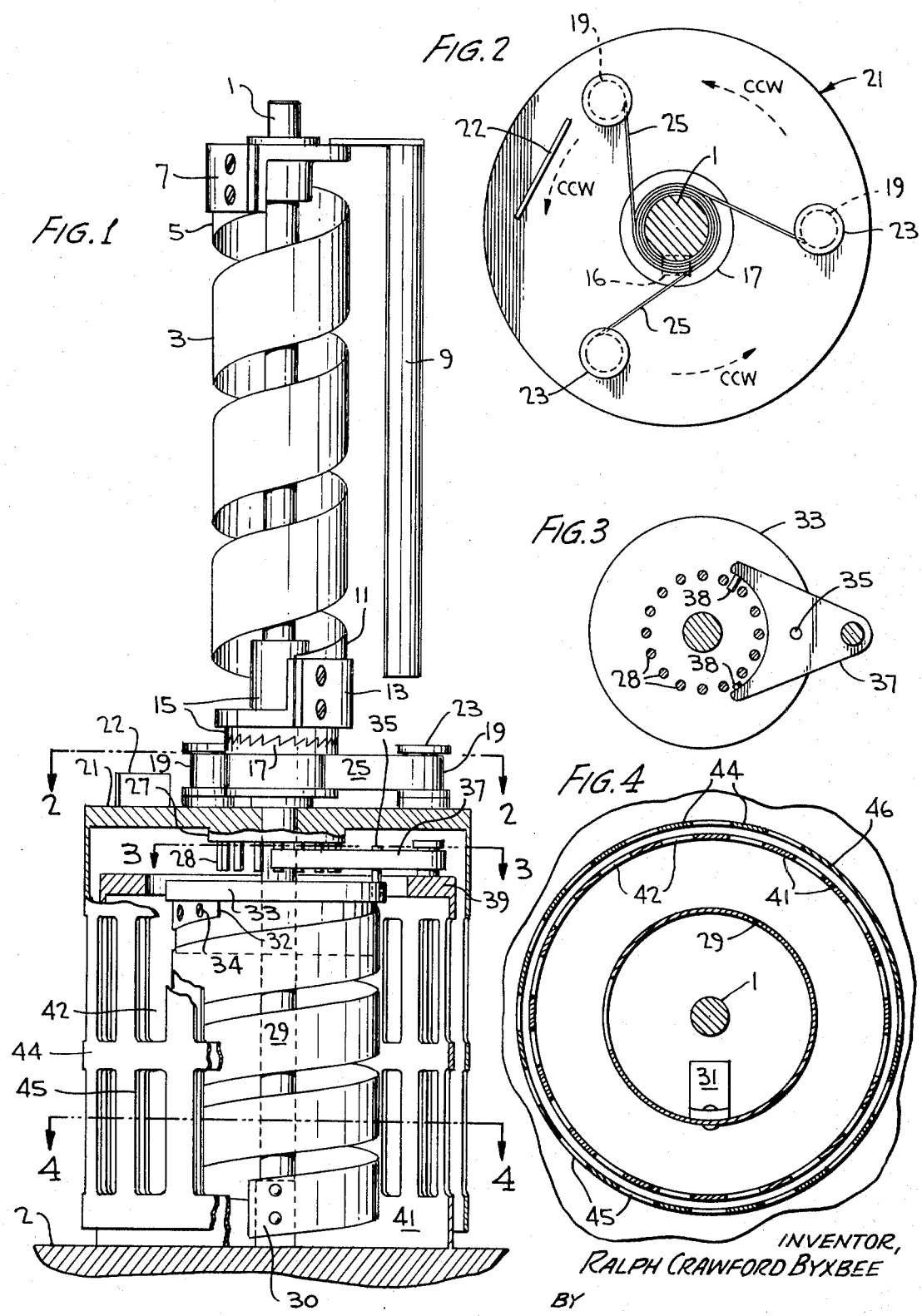
INVENTOR,
RALPH CRAWFORD BYXBEE
BY
Neil B. Siegel
ATTORNEYS

SOLAR ENERGY POWERED HELIOTROPE

ORIGIN OF THE INVENTION

The invention described herein was made in the performance of work under a NASA contract and is subject to the provisions of Section 305 of the National Aeronautics and Space Act of 1958, public law 85–568(72 STAT. 435; 42 U.S.C. 2457).

BACKGROUND OF THE INVENTION

The present invention relates generally to point of reference orienting apparatus, and in particular to a solar energy powered sun orienting heliotrope designed to orient a solar array towards the sun while operating in a passive and stored energy manner.

In extended space or orbital flight it is the usual practice to include as part of the on-board equipment solar arrays having the ability to convert solar energy directly into electrical energy to power transmitters and other equipment. Since the solar arrays are powered by solar energy, it is desirable for them always to be maintained at a normal attitude with respect to the sun's rays; the normal attitude permits maximum exposure to direct sunlight, and therefore maximum efficiency in the conversion of solar energy into electrical energy. The possibility of misorientation, i.e., the failure of the solar array to maintain a normal attitude to the sun's rays, or to be misaligned more than a few tolerable degrees from the normal, makes it desirable for the solar array to be movable, i.e., rotatable, so that it is capable of sun tracking to correct misorientation situations.

Solar array misorientation can be either of a constant or transient nature, wherein there are respectively zero and finite time rates of misalignment changes. Constant misorientation can result, e.g., because of initial misorientation as a result of initial orbit inject conditions. Transient solar array misorientation can occur as a result of vehicle instability thru its orbital path causing relative motion between the solar array and sun rector about the vehicle pitch axis. The possibility of solar array misorientation during an orbital or space flight is great, and normally requires the vehicle to carry some form of solar array tracking equipment to enable the solar array to rotate and track the sun. One such tracker, a heliotrope, is a device designed to orient itself and/or associated equipment towards the sun or other celestial reference. Heretofore, many heliotropes have included complex electromechanical assemblies requiring active power supplies, occupying limited space aboard the vehicle, consuming limited weight allocations, especially on smaller vehicles, and requiring additional equipment to generate and control process signals.

Some attempts have been made to provide heliotropes independent of active power generating equipment carried on spacecrafts. These heliotropes have relied upon energy from the sun for activating a sensor and motor, and thereby have been termed "passive" heliotropes. One prior art passive heliotrope includes pairs of counter rotating momentum transfer type radiometers symmetrically arranged upon a solar array mount so that one pair is aligned with each spacecraft axis. The counter rotating radiometers are balanced when the solar array is correctly oriented towards the sun; if misorientation occurs, a thrust generating unbalance is developed and is used to track the sun and reorient the solar array. This type of device suffers from the inherent difficulty of maintaining constant, counter rotation and precise axial alignment of the momentum transfer elements.

Several other attempts to construct passive heliotropes have involved the use of bimetallic elements. One bimetallic element heliotrope utilizes a plurality of bimetal elements to orient a solar concentrator having a reflective surface for directing sunlight onto a thermal convertor array. This device merely adds another element, i.e., the concentrator, to the array and does not place the thermal converter directly into the path of the solar energy for maximum conversion efficiency. A second bimetallic element heliotrope device, called the continuous track and reset device, comprises a solar array directly coupled to a support vehicle through a bimetallic element. Solar energy heats the element causing it to rotate until the solar array is normal to the sun. Control means must be provided to stop element rotation when the desired solar array-sun orientation is obtained. A third type of bimetallic element heliotrope utilizes an incremental advance and reset concept wherein tracking is accomplished incrementally instead of continuously. An incremental advance and reset device comprises a bimetallic element having one end fixed to the space vehicle, while the other end orients a solar array and drives a spring loaded detent wheel through a ratchet interface.

Normally some form of reset mechanism must be included on the continuous and the incremental drive devices because of solar array-sun orientation differences existing at the beginning and end of each orbit. In resetting, the bimetallic element is cooled by being shaded from solar energy, for example, so that the element reverts to an unflexed condition and is capable of again being driven in response to solar energy. If earth shading eclipse of the bimetallic element of a vehicle having a continuous or incremental advance device occurs once per orbital revolution, the element naturally cools and resets automatically so that no reset mechanism is required. However, for high attitude orbits, where no natural shading occurs, some form of auxiliary shading device must be provided to produce a bimetallic element shade-reset period once per orbit because of the turning limitations inherent in bimetallic elements.

The capabilities of continuous and incremental advance heliotrope devices are also somewhat limited since they must have both heating and cooling cycles to produce motive force for each increment of tracking. If one increment of tracking does not initially orient the solar array and shade the bimetallic element, reset cannot take place because the partially exposed fully extended element continues to be heated by solar energy, although further motion of the bimetallic element is not possible. Such a situation would exist if the solar array were initially grossly misoriented, i.e., misoriented by an amount greater than the available tracking motion provided by one heating cycle of the bimetallic element. This problem is minimal for an orbiting vehicle experiencing an earth shading since some time during the initial orbit revolution the bimetallic element is shaded to allow for reset so that the device begins tracking as designed. However, for the sake or reliability and versatility, a device capable of oreinting a solar array from any degree of misorientation and at any orbit altitude involving space vehicle — earth shading or not, is desirable.

According to the present invention a solar energy powered heliotrope functions in a passive, stored energy manner to orient a solar array towards the sun. The heliotrope comprises a bimetallic motor coil adapted to rotate and provide a work output when illuminated with solar energy. A constant torque spring assembly is tensioned by rotation of the motor coil to store useful energy as a function of the work output. A bimetallic sensing element detects any misorientation between the solar array and the sun. An escapement mechanism is actuated by the sensing element whenever misorientation between the solar array and the sun is detected; the escapement mechanism controls the heliotrope tracking rate by allowing stored energy release/solar array rotation in discrete increments as a function of alternate illumination and shadowing of the sensing element via concentric cylindrical slotted shades. The energy release — solar array rotation continues until orientation occurs.

The heliotrope of the present invention avoids the problems of the prior devices by utilizing an independently functioning motor coil to tension a constant torque spring assembly and an independently functioning sensor coil to detect array misorientation. The sensor coil automatically and continuously releases energy stored in the spring assembly to drive the array into orientation with the sun. Whereas prior passive heliotropes obtain motive force from a single bimetallic element undergoing heating cycles, and consecutive heating cycles necessarily require intervening cooling cycles, the present heliotrope is not dependent upon heating and cooling cycles of a single bimetallic element for motive force. Thus, even if a condition of gross misorientation occurs whereby a single increment of tracking motion does not produce orientation, and the heliotrope is aboard a vehicle having an orbit altitude not involving a regular earth shading, the sensor coil automatically and continuously releases the stored energy until a condition of orientation is obtained. The automatic and continuous stored energy release avoids the problem of prior heliotropes that may occur when the initial tracking motion provided by the bimetallic element does not produce orientation (and coil shading) and earth shading is not present, the bimetallic element continues to be heated but is physically incapable of further rotation.

It is, accordingly, an object of the present invention to provide a new and improved passive thermal heliotrope.

Another object of the present invention is to provide a new and improved solar energy powered heliotrope for orienting a solar array towards the sun.

Another object of the present invention is to provide a new and improved passive thermal heliotrope utilizing an incremental advance to orient a solar array towards the sun.

A further object of the present invention is to provide a new and improved passive thermal heliotrope capable of causing solar apparatus to track the sun during any orbital situation and from any degree of misorientation, including gross misorientation.

Another object of the present invention is to provide a new and improved passive thermal heliotrope utilizing stored energy to produce motive force.

The above and still further objects, features and advantages of the present invention will become apparent upon consideration of the following detailed description of one specific embodiment thereof.

BRIEF DESCRIPTION OF THE DRAWINGS

FIG. 1 is an elevation view, partly in section, of a preferred passive, stored energy thermal heliotrope of the present invention;

FIG. 2 is a sectional view taken through the line 2—2 of FIG. 1, and specifically illustrating the negator spring assembly and winding motor hub;

FIG. 3 is a cross-sectional view taken through the line 3—3 of FIG. 1, specifically illustrating the escapement mechanism and the escapement arm; and FIG. 4 is a cross-sectional view taken through the line 4—4 of FIG. 1, specifically illustrating the bimetallic sensor coil and the surrounding concentric slotted shades.

DETAILED DESCRIPTION OF THE DRAWINGS

Reference is made to the elevation view, partly in section, of FIG. 1 wherein a passive, stored energy, thermal heliotrope embodying the features of the present invention is illustrated. Shaft 1 is mounted on space vehicle 2 and extends outwardly therefrom; FIG. 1 may illustrate the deployed position of a deployable heliotrope mounted inside vehicle 2. Motor element 3 is a bimetallic helical coil having one end 5 rigidly attached to shaft 1 by bracket 7; shaft 1 extends along the longitudinal axis of motor helix 3. Shade element 9 is attached to shaft 1 via bracket 7, and extends the length of motor coil 3 along one side thereof. Lower end 11 of motor coil 3 is attached by clamp 13 to toothed drive wheel 15. Toothed motor hub 17 is rotatably mounted on shaft 1 adjacent toothed driving wheel 15. A unidirectional rotation limiting mechanism 16 (FIG. 2), only conceptually illustrated for purposes of clarity, permits motor hub 17 to rotate only in the counterclockwise direction with respect to fixed shaft 1. The unidirectional rotation limiting means 16 may be, for example, a pawl and ratchet mechanism coact-ing between shaft 1 and motor hub 17.

Bimetallic motor helix 3 functions as a work (motive force) producing element. When motor helix 3 is heated by solar energy, lower free end 11 undergoes both a rotational and an axial movement due to the differing temperature coefficient expansivities of its components. The rotational motion is counterclockwise with respect to shaft 1, and its is a substantial movement; the axial movement is negligible for purposes of this discussion, and is therefore ignored. Motor helix 3 is capable of a work output by virtue of this rotary movement of free end 11. Toothed driving wheel 15 rotates with free end 11; as driving wheel 15 rotates, it engages toothed motor hub 17 to produce a counterclockwise rotation of motor hub 17. The rotary motion of motor hub 17 constitutes a work output from motor helix 3.

Once per orbit revolution shade 9 is positioned relative to the sun to shadow motor coil 3 from solar illumination; this shading allows cooling of motor coil 3. While cooling, motor coil 3 rotates clockwise in returning to unheated, unexpanded condition from which it is again ready to perform a heating cycle and rotate motor hub 17. The clockwise cooling motion of coil 3 does not rotate hub 17 because the hub is constrained against clockwise rotation by limiting mechanism 16. Of course, if the vehicle were in an orbit having an earth eclipse once each orbit revolution, shade 9 would not be required because the eclipse would perform the shading function.

Referring now to FIGS. 1 and 2, a constant torque negator spring assembly comprises pins or spindles 19 rigidly attached to a rotatable array mount 21. Array mount 21 is rotatably mounted on shaft 1. Spools 23 are mounted on spindles 19 and springs 25 are partially wound upon the spools, while the outermost free ends of springs 25 are attached to rotatable motor hub 17. When motor hub 17 rotates, the springs 25 are tensioned and partially wound onto hub 17; the negator spring assembly and the supporting array mount 21 do not rotate with motor hub 17 because an escapement mechanism 27 controls rotation of array mount 21 in a manner to be described below.

The winding of springs 25 onto motor hub 17 while maintaining the array mount/negator spring assembly stationary tensions springs 25 so that useful energy is stored therein. This useful stored energy is capable of being released to perform a work function. When the energy stored in leaf springs 25 is subsequently and controllably released, i.e., when array mount 21 is free to rotate, the springs unwind from motor hub 17 by producing a counterclockwise rotation of supporting array mount 21. The controlled rotation of the array mount/spring assembly by tensioned springs 25 represents a work function. It will be noted that springs 25 must unwind from motor hub 17 by producing a counterclockwise rotation of array mount 21 because motor hub 17 is capable of rotating only in the counterclockwise direction. Tension in springs 25 can only be released when the array mount/spring assembly rotates about motor hub 17 to unwind the springs therefrom.

Referring now to FIGS. 1 and 3, sensing element 29 is a bimetallic helical coil having one end 30 attached to shaft 1 by bracket 31; shaft 1 extends along the longitudinal axis of sensing helix 29. A rigid pusher member 33 is attached to the end 32 of sensing coil 29 by bracket 34. A pusher pin 35 extends upwardly from pusher member 33 and engages a slot 36 in escapement actuating arm 37. Actuating arm 37 is pivotally mounted on shoulder 39 of a stationary inner cylindrical shade 41 (FIGS. 1 and 4). Shade 41 is rigidly fixed to vehicle 2 and comprises an open-ended cylindrical shell having shaft 1 extending along its longitudinal axis; a plurality of axially extending circumferentially continuous slots or narrow passages 42 cover the surface of shade 41.

An outer shade 44 is illustrated as being an integral part of rotatable array mount 21. Outer shade 44 comprises a cylindrical body concentric with fixed shade 41 and having a plurality of axially extending circumferentially continuous slots or narrow passages 45 covering its surface. The slots 42 in shade 41 are identical in size and shape to the slots 45 in shade 44. When the slots in shade 41 are aligned with the slots in shade 44, solar energy may freely pass through the superimposed openings. However, when the slots of shade 41 are not aligned with the slots of shade 44, substantially all solar energy will be blocked from passing through the shades, and, consequently, sensing element 29 will be shaded.

A solid lock-on slat or arc section 46 (FIG. 4) is attached to outer shade 44. Slat 46 may be integral with shade 44. A solar array, conceptually illustrated at 22, is mounted on array mount 21 and is coplanar with lock-on slat 46. When lock-on slat 46 is normal to the sun, solar array 22 will be properly oriented towards the sun, and sensing element 29 will be shaded from the sun. Lock-on slat 46 is of such size and shape that when it is normal to the sun, sensing coil 29 will be shaded from solar illumination even though the slots in fixed shade 41 and outer shade shade 44 are aligned.

When exposed to solar illumination, sensor coil 29 will experience both a counterclockwise rotation and an axial displacement with respect to shaft 1; the axial component is negligible for purposes of this discussion and is therefore ignored. In operation, when solar array 22 is misoriented with respect to the sun, i.e., when both lock-on slat 46 and coplanar solar array 22 are not normal to solar illumination, and assuming the slots in fixed shade 41 are aligned with the slots in outer shade 44, solar illumination will heat sensing coil 29 and cause a rotational movement of its upper end 32. This rotational movement will be counterclockwise with respect to shaft 1. When the slots in fixed shade 41 and rotatable outer shade 44 are not aligned, sensing coil 29 will be shaded from solar illumination and will undergo a cooling cycle. During the cooling cycle, upper end 32 of coil 29 will undergo a clockwise rotation with respect to shaft 1 as it returns to its unheated unflexed position. Fixed shade 41 and rotatable shade 44 are positioned and designed so that when outer shade 44 rotates in discrete increments, in a manner to be presently described, about fixed shade 41, the slots in both shades will alternately be aligned and non-aligned to intermittently permit solar illumination and shading, respectively, of sensing coil 29.

Referring now to FIGS. 1 and 3, an escapement mechanism is conceptually illustrated as a wheel-like appendage 27, integral with array mount 21 and having a plurality of escapement wheel fingers 28 descending downwardly therefrom. Escapements such as this are most commonly found in time piece mechanisms and are essentially devices for permitting unidirectional rotational motion in discrete increments or steps. Escapement wheel 27 is integral with array mount 21 so that when array mount 21 rotates, escapement wheel 27 rotates and vice versa. Escapement arm 37 has two pins 38 (FIG. 3) of different lengths at the ends thereof; arm 37 is pivotally supported adjacent escapement wheel 27 so that pins 38 interdigitate with fingers 28.

Array mount 21 cannot rotate while pins 38 engage fingers 28. When sensor coil 29 undergoes a heating cycle, pusher member 33 rotates with coil end 32 so that pin 35 causes a displacement of arm 37. A single heating cycle produces sufficient displacement of arm 37 so that pins 38 disengage fingers 28; when pins 38 no longer engage fingers 28, array mount 21/escapement mechanism 27 is free to rotate counterclockwise under the constant tension exerted by springs 25. The displacement of arm 37 is such that only a single finger 28 can rotate past each pin 38; this motion is defined as one increment of rotation. Likewise, when sensor coil undergoes a cooling cycle, pusher member 33 again rotates with coil end 32 so that pin 35 again causes a displacement of arm 37. A single cooling cycle produces sufficient displacement of arm 37 so that pins 38 disengage fingers 28; when pins 38 no longer engage fingers 28, array mount 21/escapement mechanism 27 is free to rotate counterclockwise under the constant tension exerted by springs 25. Again the displacement of arm 37 is such that only a single finger 28 can rotate past each pin 38; this motion constitutes one increment of rotation.

The number and spacing of the slots 42 and 45 in shades 41 and 44, respectively, and the number and spacing of the fingers 28 are chosen so that the alignment and non-alignment of the slots will be synchronized with the incremental rotation of the escapement mechanism 27. Thus, the slots will be alternately aligned and non-aligned by the incremental rotations of the array mount/escapement mechanism.

The operation of the presently disclosed passive thermal heliotrope will be described as consisting of an energy storage mode and a tracking mode. However, it must be realized that the present invention is capable and, in fact, does operate under both modes simultaneously. This discussion of operational modes assumes that the presently disclosed heliotrope is mounted upon an earth orbiting vehicle for purposes of orienting a solar array towards the sun.

At least once per orbit rotation, motor coil 3 undergoes a heating cycle due to solar illumination and a cooling cycle due to shading so that free end 11 experiences oscillating rotations about shaft 1. The rotations of free end 11 are transferred to motor hub 17 via toothed driving wheel 15; however, hub 17 is only capable of counterclockwise rotation because of rotation limiting mechanism 16. As hub 17 is driven counterclockwise about shaft 1, springs 25 are wound onto hub 17 and tensioned because the array mount 21 on which the spring assembly is mounted is normally prevented from rotating due to pins 38 engaging fingers 28. The result is that tensioned springs 25 exert a constant counterclockwise torque on array mount 21 and the energy stored in the springs 25 is capable of performing useful work by rotating array mount 21 whenever pins 38 disengage fingers 28.

In describing the manner whereby the present heliotrope causes a misoriented solar array to track and reorient itself to a normal attitude to solar illumination, it will be further assumed that the slots 42 and 45 in shades 41 and 44, respectively, are initially aligned and the solar array is grossly misoriented. Thus array 22 and coplanar arc section 46 are misoriented from the sun; and solar illumination passing through aligned slots 42 and 45 causes a heating cycle of sensor coil 29 so that end 32 experiences a counterclockwise rotation about shaft 1. Rotation of end 32 is transferred to escapement arm 37 via pusher 33 and pin 35 so that arm 37 is displaced. As arm 37 is displaced, pins 38 disengage fingers 28, thereby removing the restraining force which prevented mount 21 from rotating under the constant torque of tensioned springs 25; and mount 21 rotates in the counterclockwise direction. Each heating cycle of coil 29 causes sufficient displacement of arm 37 to permit one increment of rotation of mount 21; the array 22 supported by mount 21 and outer shade 44 integral with mount 21 also undergoes one increment of rotation.

The shades 41 and 44 are synchronized with the escapement mechanism 27 so that consecutive incremental rotation of mount 21 cause slots 42 and 45 to be alternately aligned and nonaligned. Thus, the incremental rotation of mount 21 caused by the heating cycle of coil 29 during which slots 42 and 45 were aligned, will result in shade 44 being incrementally rotated so that slots 42 and 45 are non-aligned. Non-alignment of slots 42 and 45 causes shading of coil 29 from solar illumination, and allows the coil to undergo a cooling cycle whereby end 32 experiences a clockwise rotation about shaft 1. Again rotation of end 32 is transferred to escapement arm 37 via pusher 33 and pin 35 so that arm 37 is displaced. Displacement of arm 37 causes pins 38 to disengage fingers 28, thereby removing the restraining force which prevented mount 21 from rotating under the constant torque of tensioned springs 25. Thus, mount 21 rotates, but again in the counterclockwise direction. Each cooling cycle of coil 29 causes sufficient displacement of arm 37 to permit one increment of rotation of mount 21, thereby producing an incremental clockwise rotation of both solar array 22 and outer shade 44. Since shades 41 and 44 are synchronized with escapement mechanism 27, the incremental rotation produced by a cooling cycle of coil 29 during non-alignment of slots 42 and 45 will cause alignment of the slots due to an incremental rotation of outer shade 45. Thus, the shades are now aligned and prepared to undergo a further heating cycle caused by solar illumination.

The above described heating cycle-array mount rotation/cooling cycle-array mount rotation automatically continues until solar array 22 and coplanar lock-on slat 46 are normal (oriented) to the sun. When this normal attitude condition exists, no further heating/cooling cycles of sensor coil 29 are possible because arc section 46 entirely shades coil 29 from solar illumination. No tracking motion of array 21 will occur until the array is again misoriented to the sun and arc section 46 no longer protects coil 29 from solar illumination.

When slat 46 is normal to the sun, the slats in shades 41 and 44 will be aligned and ready to undergo a heating cycle in response to solar array misorientation. This slat alignment condition exists regardless of the last cycle (heating or cooling) which produced the solar array orientation. If the sensor coil 29 of the orienting cycle was undergoing a heating cycle, slat 46 shades sensor coil 29 and permits a cooling cycle (and alignment of the slats). If the orienting cycle was a cooling cycle, a heating cycle (and non-alignment of the slats) is also prevented because of the relative positions of the slats and coil 29.

Possible theoretical tracking torque development by a passive stored energy heliotrope of the present invention has been calculated. For example, in an orbital situation providing a temperature range of −130° to 265° F, a motor coil wound from 2 × 50 × 0.90 inch P675R Truflex (trademark) should provide an angular response of 0.91° arc/° F, and a torque of 10.1 in-oz/° arc restrained. Under actual operating conditions of 9.5° restrained arc, constant tracking torque should be 95.9 in-oz. Constant tracking torque is that torque available to rotate a mounted solar array. Orientation torque for inertial acceleration is negligible for even very large solar arrays. Bearing and slipring torque are the governing factors. Required torque for a 600 watt array is in the order of 45 in-oz.

A test model, scaled and tested for thermal response, utilized Truflex coils. Truflex is a Texas Instruments trademark and is designated P675 composition. The composition schedule is:

| High Expansion Side Alloy % By Thickness | Low Expansion Side Alloy % By Thickness |
|---|---|
| 18 Cu 55 12 Ni | 64 Fe 45 (Invar) |

Vickers Hardness for standard reduction:

| High Expansion Side | Low Expansion Side |
|---|---|
| 190–240 | 210–260 |

Using a simple oxidized thermal coating on the motor coil, its temperature reached 211° F at 1-sun solar intensity. Use of an anodized titanium coating increased the upper coil temperature to 390° F. Sensor coil actuation temperatures are adjustable and for these tests were 68° F and 182° F for low and high actuation zones, respectively. Shade slots were cut in 10° increments to provide for ± 10° orientation.

While there has been described and illustrated one specific embodiment of my invention, it will be clear that variations in the details of the embodiment specifically illustrated and described may be made without departing from the true spirit and scope of the invention as defined in the appended claims.

I claim:

1. A solar energy powered heliotrope for orienting a solar array towards the sun comprising motor means responsive to solar energy for generating a work output; energy storage means coupled to said motor means for storing energy as a function of said work output; sensing means for detecting misorientation between said solar array and the sun; and means actuated by said sensing means for stepwise releasing energy stored by said storage means to drive said solar array.

2. The heliotrope of claim 1 wherein said means actuated by said sensing means is an escapement means.

3. The heliotrope of claim 1 wherein said motor means and said sensing means comprise bimetallic elements.

4. The heliotrope of claim 3 wherein said bimetallic elements comprise helically shaped coils.

5. The heliotrope of claim 3 wherein said energy storage means comprises a constant torque spring assembly.

6. A solar energy powered heliotrope for orienting a solar array towards the sun comprising thermal motor means responsive to solar energy for generating a work output; energy storage means receiving said work output for storing useful energy as a function of said work output; thermal sensing means for detecting misorientation between said solar array and the sun; and escapement means actuated by said thermal sensing means for releasing energy stored by said storage means to drive said solar array and thereby produce orientation of said solar array towards the sun.

7. The heliotrope of claim 6 wherein said thermal motor means and said thermal sensing means comprise bimetallic helical coils.

8. The heliotrope of claim 7 wherein said energy storage means comprises a constant torque spring assembly wherein said energy is stored in tensioned springs.

9. The heliotrope of claim 8 wherein said thermal sensing means further comprises shade means for alternately causing solar illumination and shadowing of said thermal sensing means whereby said escapement means is actuated by said thermal sensing means to release said energy stored by said storage means in discrete increments each time said sensing means is illuminated or shadowed.

10. The heliotrope of claim 9 wherein said shade means comprises an inner cylindrical shade fixedly positioned to completely surround said thermal sensing means, and an outer cylindrical shade concentric and rotatable with respect to said inner shade, both said inner and outer shades having a plurality of alignable slots therein whereby said thermal sensing means is illuminated when said plurality of slots are aligned and is shadowed when said plurality of slots are misaligned.

11. The heliotrope of claim 10 wherein said outer cylindrical shade is rotated by each release of said energy stored by said storage means, and said inner and outer shades are synchronized with said escapement means whereby whenever one increment of energy is released so that said outer shade rotates to misalign said slots, an immediately succeeding release of said energy stored by said storage means rotates said outer shade to align said slots.

12. The heliotrope of claim 11 wherein said outer shade further comprises a solid arc section on a surface of said outer shade, said solid arc section being capable of shadowing said thermal sensing means when said solid arc section is normal to the sun.

* * * * *